A. McMILLAN.
BAND SAW FILING MACHINE.
APPLICATION FILED DEC. 9, 1918.
1,349,685.
Patented Aug. 17, 1920.
3 SHEETS—SHEET 1.
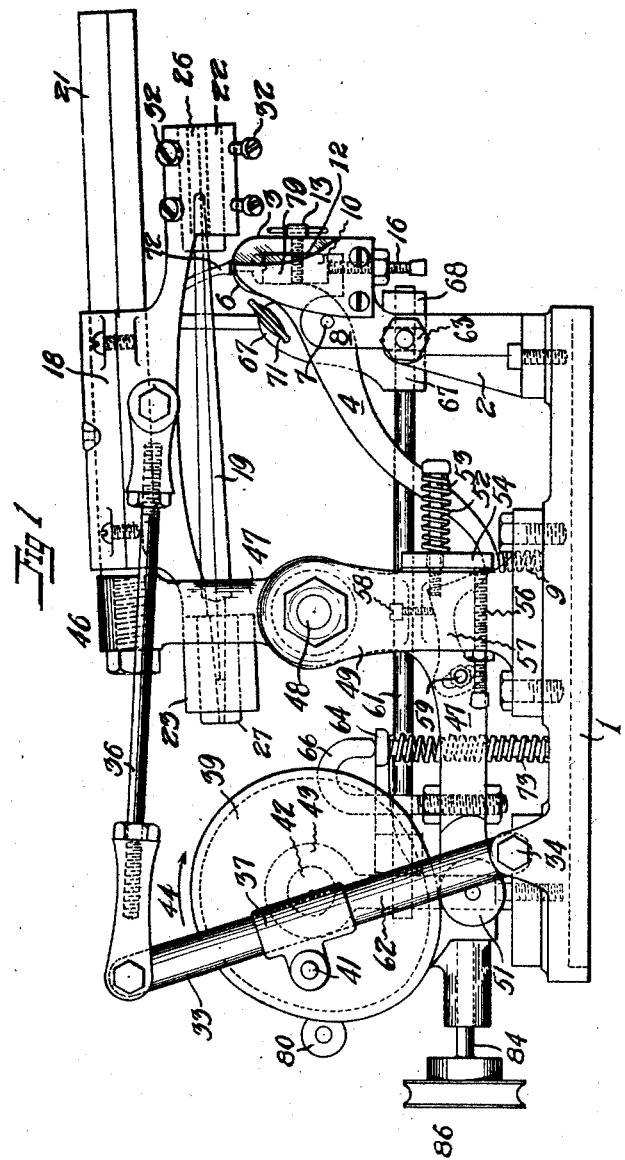
WITNESS
C. S. Evans
INVENTOR
A. McMillan.
BY White & Prost
HIS ATTORNEYS

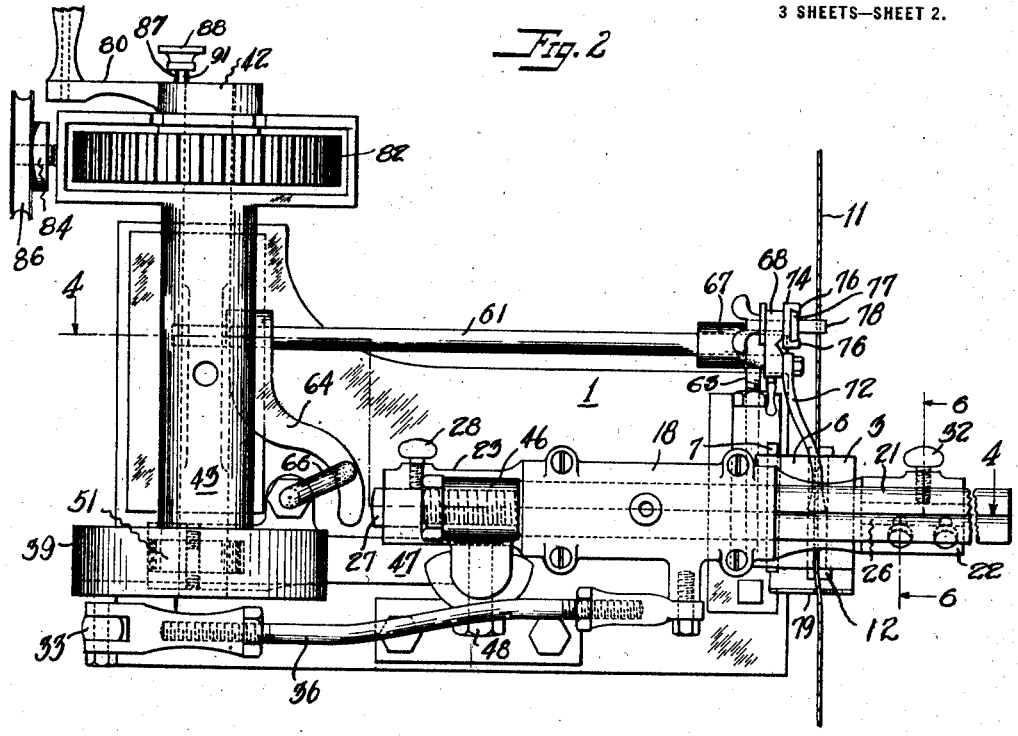

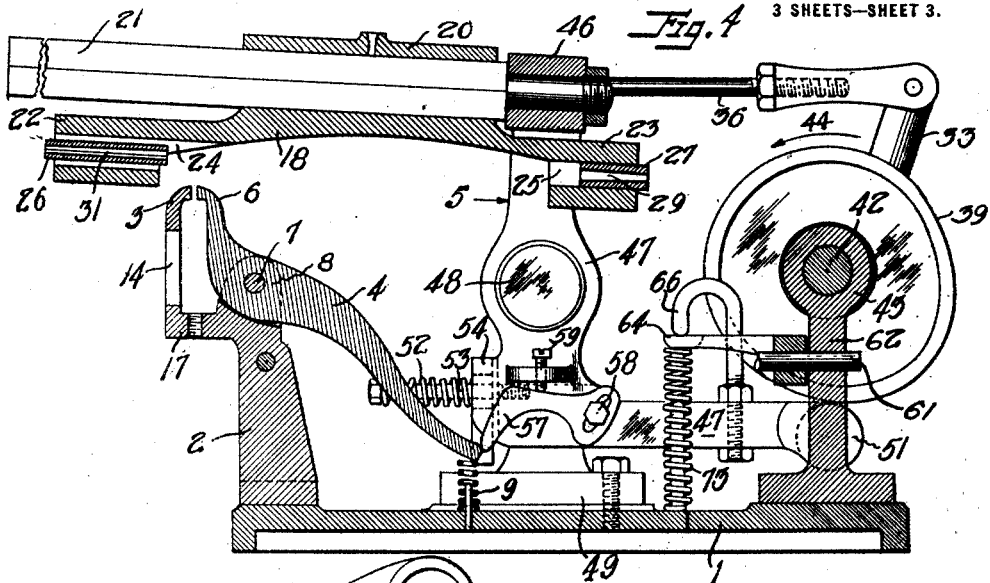

UNITED STATES PATENT OFFICE.

ANGUS McMILLAN, OF SAN FRANCISCO, CALIFORNIA.

BAND-SAW-FILING MACHINE.

1,349,685.  Specification of Letters Patent.  Patented Aug. 17, 1920.

Application filed December 9, 1918. Serial No. 265,842.

*To all whom it may concern:*

Be it known that I, ANGUS MCMILLAN, a citizen of the United States, and a resident of the city and county of San Francisco and State of California, have invented a new and useful Band-Saw-Filing Machine, of which the following is a specification.

My invention relates to an apparatus for filing band saws.

An object of the invention is to provide an improved automatic machine for filing the teeth of band saws.

Another object of my invention is to provide a filing machine of the class described in which the operation of the file is substantially the same as in the hands of an expert hand filer.

Another object of my invention is to provide a filing machine of the class described in which means are included for preventing momental movement of the saw.

The invention possesses other features of advantage, some of which, with the foregoing will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a side elevation of the band saw filing machine of my invention.

Fig. 2 is a plan view of the machine.

Fig. 3 is an end view taken from the right end of the machine as shown in Fig. 1.

Fig. 4 is a vertical longitudinal sectional view through the machine. The plane of section is indicated by the line 4—4 of Fig. 2.

Fig. 5 is an elevation of the main rocker arm of the machine. The direction in which the view is taken is indicated by the arrow 5, Fig. 4.

Fig. 6 is a vertical sectional view through the front end of the file holding frame. The plane of section is indicated by the line 6—6 of Fig. 2.

Broadly stated the preferred embodiment of my invention comprises means for holding a band saw, means for passing a file over a tooth in the saw, lifting the file upwardly and sidewardly away from the tooth and returning it to beginning-stroke position at high speed, and means operating simultaneously with the return stroke of the file to release the saw from the holding means, move it forward one tooth and again clamp it fast. Means are also provided for varying the amount of feed of the saw; for adjusting the file relative to the teeth of the saw; for varying the position of the saw relative to the holding means; for preventing even at high operating speeds a momental movement of the saw; and for varying the feed of the saw relative to the cutting position of the file.

Rigidly mounted upon the bed plate 1 is a post 2 having integrally formed at its upper end, the fixed jaw 3 of the saw holding vise. A lever 4, of which the short arm 6 forms the movable jaw of the vise, is pivoted on the pin 7 held in lugs 8 formed on top of the post 2. A coil spring 9 disposed between the end of the lever 4 and the bed plate resiliently holds the jaw 6 against the saw. Slidably arranged on the inside of the fixed jaw 3 is a bearing block 10 lightly grooved in the top surface to receive the rear edge of the saw 11, Fig. 3. The ends of the block are provided with flanges 12 engaging the sides of the jaw to prevent rocking of the block and a screw 13 passing through a slot 14 in the jaw provides means for clamping the bearing block in its vertically adjusted position. Preferably also a lock nutted screw 16 in the horizontal extension 17 of the post provides a positive support for the bearing block.

Reciprocating over the saw vise is a frame 18 in which a slim taper saw file 19 is adapted to be held. The frame comprises a babbitted box 20 slidably mounted on a preferably square-section bar 21, and provided with arms 22 and 23 at the front and rear thereof respectively. The arms 22 and 23 are formed with alined apertures 24 and 25 respectively adapted to receive the thimbles 26 and 27 respectively which hold the point and tang respectively of the file. The thimble 27 forms a snug fit and is revoluble in the aperture 25 and is clamped therein by the thumb screw 28. A tapered socket 29 adapted to receive the tang of the file 20 is formed in the thimble 27 and a triangular socket 31 is formed in the thimble 26 to receive the point of the file. The aperture 24 is larger than the thimble 26 which is adjustable laterally and revolubly therein by screws 32 one of which is conveniently a thumb screw. The structure just described permits longitudinal revoluble and lateral adjustment of the file so that it may readily be set, relative to the saw teeth, exactly as required.

Means are provided for imparting a quick-return reciprocal motion to the frame 18 upon the bar 21. A link 33 is pivoted at its lower end upon the plate 1 by means of the pin 34 and the upper end is connected to the frame 18 by the rod 36 pivotally attached to both link and frame. A box 37 is slidably arranged on the link 33 and pivotally connected to the cam disk 39 by the pin 41. The disk is fixed upon the shaft 42 journaled in the bearing box 43 set upon the bed plate 1. Rotation of the shaft and cam disk in the direction of the arrow 44 imparts a forward movement to the connecting rod and frame slightly faster than the forward movement of the pin 41, but on the return stroke, during which the box 37 has moved downwardly toward the pivot 34 and consequently greatly increased the length of the link 33 above the pin and shortened the length below it, a relatively rapid movement is imparted to the connecting rod and frame.

Means are provided for lifting the saw frame 18 to move the file upwardly and sidewardly out of contact with the teeth of the saw during the rapid return stroke of the frame and for lowering the frame in the same way to reëngage the file with the succeeding tooth. The bar upon which the frame 18 reciprocates is rigidly secured at its rear end in the socket 46 formed in the upper end of the vertical arm of an L-form rocker 47, pivotally secured by the pin 48 to the post 49 attached rigidly to the bed plate. The horizontal arm of the rocker is provided with a roller 51 disposed below the peripheral face of the cam 39 which is so formed as to depress the rocker arm rapidly at the conclusion of the forward stroke of the file frame, thus throwing up the bar 21 about the pivot 48 and raising the file. Near the end of the return stroke of the file frame, the cam face permits the rocker arm to rise, thus lowering the bar to engage the file for the forward stroke during which the cam presents a circular face to the roller to hold the bar stationary. The movement of the rocker by the cam is opposed by a coil spring 52 compressed between the head of the pin 53 set in the post 49 and a lip 54 projecting from the rocker and extending around the front side of the post 49. A lock-nutted set screw 56 extending through the post 49 and impinging upon the lip 54 provides an adjustable stop by which the lower position of the bar 21 may be regulated irrespective of the circular face of the cam.

In order to cause the file to be lifted out of engagement with the saw sidewardly as well as upwardly the pin 48 is disposed at an angle so that the plane in which the frame moves slants from the plane perpendicular to the line of motion of the saw, in such a way that while the file moves across the teeth at right angles to the saw blade, it is lifted sidewardly out of engagement with the teeth, so as to clear the hook or rake of the tooth.

On the return stroke of the file, it is necessary to feed the saw forwardly so as to bring the next succeeding tooth into position. Means are therefore provided for releasing the grip of the movable vise jaw upon the saw blade, to permit the feeding mechanism to move the saw. The long arm of the lever 4 is extended downwardly adjacent the rocker in position to be engaged by the lug 57 adjustably secured to the rocker by the screws 58 and 59. The rounded edge of the lug engages a beveled edge of the arm 4 at the end of the working stroke of the file, pressing it downwardly against the resistance of the spring 9 and releasing the jaw 6. The feeding mechanism then operates to advance the saw an amount equal to the length of one tooth. With the end of the return stroke of the file, the movement of the rocker frees the lug 57 from the arm 4 and permits the spring 9 to close the jaw 6 firmly upon the saw.

Means are provided for feeding the saw forward to place the next tooth in filing position during the return stroke of the file. A shaft 61 is journaled at one end in the web 62 supporting the box 43, and at the other end in a lug 63 projecting from the post 2. An arm 64 fixed upon the shaft 61 extends adjacent the horizontal arm of the rocker 47, the end being curved concentric with the axis of a hook 66 mounted on the rocker the downturned end of which engages the arm. The hook is pivotally adjustable in the rocker and by turning it toward or away from the shaft 61, the length of the effective lever arm is shortened or lengthened so that the amount of movement of the arm and of the shaft 61 may be regulated. On the other end of the shaft an arm 67 is fixed on one side of the lug 63 and on the other side, an arm 68 is pivotally mounted on the shaft. The pivoted arm extends between two lugs 69 on the fixed arm 67 and its position on the shaft 61 is adjustably fixed by means of thumb screws 71 threaded through the lugs and impinging on opposite sides of the arm. A pawl 72 adapted to engage the teeth of the saw is pivoted to the top of the arm. From the above structure it will be clear that downward movement of the rocker arm will depress the lever arm 64 against the resistance of the spring 73 disposed thereunder thus rocking the shaft 61 and causing the pawl 72 to advance the saw, the amount of the advance being controllable by adjustment of the hook 66, and the point to which a given tooth is moved being controllable by adjustment of the lever 68 between the lugs 69. With an upward movement of the rocker arm, the spring 73 effects a reverse movement of the shaft 61 and the recovery of the pawl.

Means are provided for feeding the saw regularly even in case of inoperativeness of the pawl due to a missing tooth. Pivotally adjustably mounted on the upper end of the arm 68 is a plate 74 provided with undercut flanges 76 within which a block 77 is adapted to slide. The block is provided with a lug 78 adapted upon adjustment of the plate to engage the teeth of the saw simultaneously with the pawl. In case of a missing tooth, either the pawl or the lug 78 effects the forward movement of the saw.

One of the chief difficulties in a band saw filing machine is the tendency of the saw to move too far with each forward feeding movement, due to momentum. In order to prevent this momental movement I have secured a plate 79 to the side of the post 2. The front edge of the plate is so disposed with reference to the space between the jaws of the vise that the saw blade as it emerges from the jaws is slightly flexed. The resilience of the blade thus provides the necessary braking effect to prevent the saw from running beyond the point to which the feeding mechanism moves it.

Means are provided for turning the shaft 42 by hand or belt power. A crank 80 for hand operation is fixed upon the end of the shaft and revolubly mounted on the shaft inside the crank; and within the housing 81 formed at the end of the bearing 43, is a worm wheel 82 engaged with a worm 83 arranged on the shaft 84 which carries the pulley 86 adapted to be turned by a belt from any suitable source of power. A spring pressed pin 87 movable by the knob 88 passes through the crank hub and is adapted to seat in a socket 89 in the worm wheel hub to lock the worm wheel for rotation with the shaft. The pin is held out of engagement with the worm wheel by a lug 91 which engages the face of the crank hub when the knob is pulled out and turned to misaline the lug from a recess in which it lies when the pin is in engagement with the worm wheel.

I claim:

1. In a band saw filing machine a vise for holding the saw, a pivotally mounted rocker adjacent the vise, a file-holding frame slidably mounted on said rocker above said vise, means for reciprocating said frame, the motion being more rapid during the recovery stroke than during the working stroke, means operative during the recovery stroke of the frame for pivotally moving said rocker, and means operative during the recovery stroke of the frame for advancing the saw in said vise.

2. In a band saw filing machine, a vise for holding the saw, a rocker pivotally mounted adjacent the vise, a file-holding frame slidably mounted on said rocker above said vise, means for reciprocating said frame, and means for imparting motion to said rocker to lift said frame during its recovery stroke, the pivotal axis of said rocker being inclined to impart a lateral movement to the frame during said lifting.

3. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, and means for pivotally moving said rocker to lift said bar during the recovery stroke of said frame and for advancing the saw in said vise.

4. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, means for pivotally moving said rocker to lift said bar during the recovery stroke of said frame, a pivotally arranged shaft, a lever arm on said shaft extending adjacent said rocker, means on said rocker operatively engaging said lever arm and adjustable to vary the effective length thereof, and means on said shaft for advancing the saw in said vise.

5. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, means for pivotally moving said rocker to lift said bar during the recovery stroke of said frame, a pivotally arranged shaft, a lever arm on said shaft extending adjacent said rocker, means on said rocker operatively engaging said lever arm and adjustable to vary the effective length thereof, a second arm mounted for pivotal motion with said shaft, a pawl for engaging the saw mounted on said second arm, and means for adjusting said second arm to vary its circumferential position on said shaft.

6. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, means for pivotally moving said rocker to lift said bar during the recovery stroke of said frame, a pivotally arranged shaft, a lever arm on said shaft extending adjacent said rocker, means on said rocker operatively engaging said lever arm and adjustable to vary the effective length thereof, a second arm mounted on said shaft, a pawl for engaging the saw mounted on said second arm, a third arm fixed to said shaft adjacent said second arm, and means on said third arm for adjusting circumferentially the position of said second arm on said shaft.

7. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, means for pivotally moving said rocker to lift said bar during the recovery stroke of said frame, a pivotally arranged shaft, a lever arm on said shaft extending adjacent said rocker, means on said rocker operatively engaging said lever arm and adjustable to vary the effective length thereof, a second arm mounted for pivotal motion with said shaft, a pawl for engaging the saw pivoted on said second arm and a block slidably mounted on said second arm and provided with a lug adapted to engage said saw.

8. In a band saw filing machine, a vise for holding the saw, a rocker pivotally mounted adjacent the vise, a bar fixed on said rocker and extending over said vise, a file-holding frame slidably mounted on said bar, means for reciprocating said frame upon said bar, means for pivotally moving said rocker to lift said bar during the recovery stroke of said frame, a pivotally arranged shaft, a lever arm on said shaft extending adjacent said rocker, means on said rocker operatively engaging said lever arm and adjustable to vary the effective length thereof, and means engaging the saw at spaced points for advancing the saw in said vise operatively arranged on said shaft.

9. In a band saw filing machine, a vise for holding the saw, a rocker pivotally mounted adjacent the vise, a file-holding frame slidably mounted on said rocker above said vise, a link pivotally mounted at one end, a rod connecting the other end of the link to said frame, a rotatable disk, and a box pivoted to the disk and slidably arranged on said link.

10. In a band saw filing machine, a vise for holding the saw, a rocker pivotally mounted adjacent the vise, a file-holding frame slidably mounted on said rocker above said vise, a link pivotally mounted at one end adjacent said rocker, a rod connecting the other end of the link to said frame, a rotatable disk having a cam face engaging said rocker, a box pivoted to the disk and slidably arranged on said link, and means for turning said disk.

11. In a band saw filing machine, a vise for holding the saw, a rocker pivotally mounted adjacent the vise, a file-holding frame slidably mounted on said rocker above said vise, a link pivotally mounted at one end adjacent said rocker, a rod connecting the other end of the link to said frame, a rotatable disk having a cam face engaging said rocker, a box pivoted to the disk and slidably arranged on said link, and means operated by said rocker during the recovery stroke of said frame for releasing the vise and advancing the saw.

12. In a band saw filing machine, a vise for holding the saw, means for advancing the saw in the vise, and means for flexing the saw to prevent momental movement thereof during said advance.

In testimony whereof I have set my hand at San Francisco, California, this 23d day of November, 1918.

ANGUS McMILLAN.

In presence of—
C. S. Evans.